May 22, 1956
A. VAN DUYN
2,746,342
WEIGHING SCALE
Filed Sept. 21, 1950
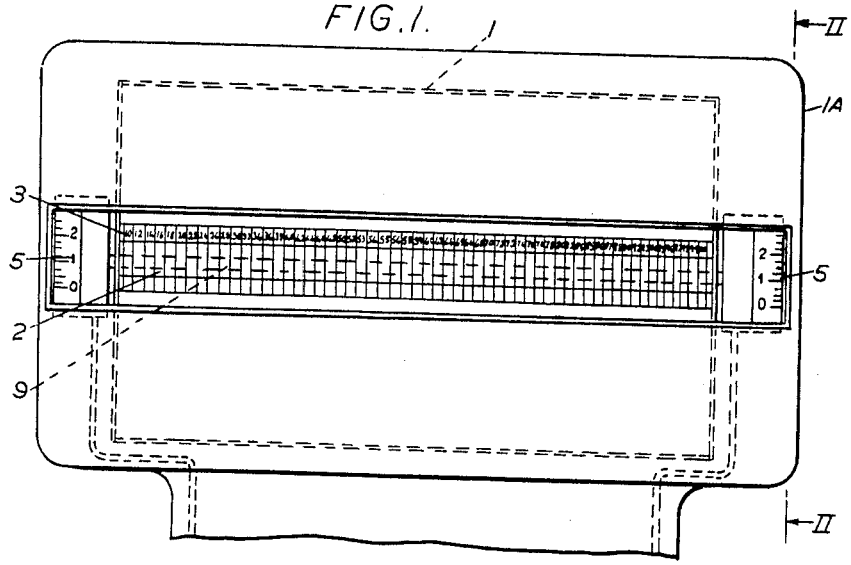
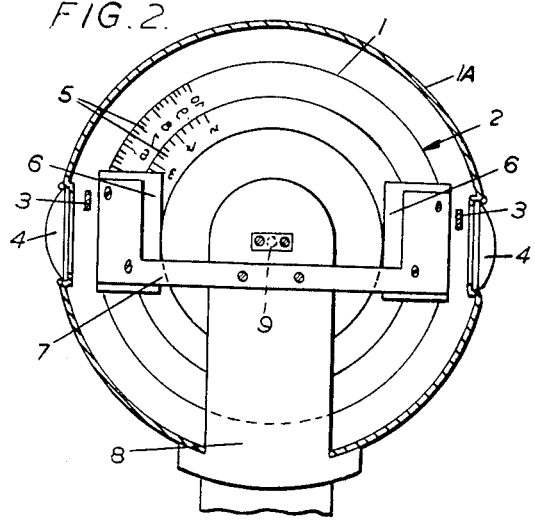
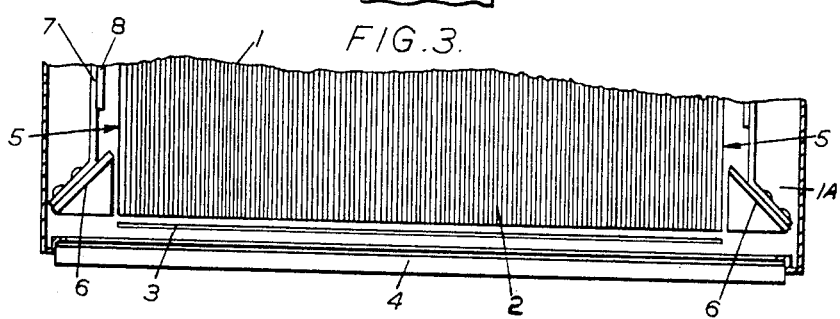
Inventor:
Adrianus van Duyn.
By Spencer, Johnston, Cook & Root
Attys.

United States Patent Office 2,746,342
Patented May 22, 1956

2,746,342
WEIGHING SCALE

Adrianus van Duyn, Hillegersberg, Rotterdam, Netherlands, assignor to U. S. Slicing Machine Company, Inc., La Porte, Ind., a corporation of Indiana Application September 21, 1950, Serial No. 185,972

Claims priority, application Great Britain October 8, 1949

2 Claims. (Cl. 88—1)

This invention relates to weighing scales and more particularly to scales of the type having a rotary cylindrical drum with a set of indicating characters on its peripheral face.

It is an object of the invention to increase to a maximum the number of indicating characters on the drum, while enabling the indications given by different sets of characters to be viewed simultaneously.

According to the invention, in a weighing scale of the aforesaid type there is provided a set of indicating characters on at least one transverse end of the drum, and optical deflecting means adapted to direct an optical image of characters of the set into a position parallel to the peripheral face of the drum. The invention further contemplates the provision of a set of indicating characters on the peripheral face of the rotating drum of the scale, a second set of indicating characters at the transverse end of the drum and an optical reflecting means positioned to project an optical image of the second set into a plane parallel to that of the first set so that the indications given by the different sets of characters are viewable simultaneously and apparently side by side.

An embodiment of the invention will now be described, but merely by way of example, with reference to the accompanying drawing in which:

Fig. 1 is a side elevation of the upper part of a drum-scale;

Fig. 2 is a sectional end view taken along the line II—II of Fig. 1; and

Fig. 3 is a fragmentary sectional plan view of the scale in Fig. 1.

Referring to the drawing, the device described herein for illustrative purposes has a rotary cylindrical drum 1 enclosed in a casing 1A, a chart 2 with computed-price characters thereon forms the peripheral face of the drum 1 and cooperates with stationary unit-price plates 3 on the scale frame at opposite sides of the drum 1 to indicate the computed price of the goods being weighed, the indication being viewed through window lenses 4 at opposite sides of the scale.

Each transverse end face of the drum is in the form of a circular chart (Fig. 2) having thereon two adjacent series 5 of weight characters, said two series cooperating respectively with two diametrically opposed stationary pointers (not shown) to indicate the weight of goods on the scale.

Optical images of the diametrally opposed weight indications 5 at each end of the drum 1 are projected horizontally outwards in opposite directions, through extensions of the viewing lenses 4, by means of a pair of reflecting mirrors 6—6 mounted one at each end of a transverse horizontal arm 7 (Fig. 2) secured to the end frame 8. The frame 8 also carries the drum axle 9. The reflecting surface of each mirror 6—6 is at 45° to the drum axis, so that the images are projected at right angles to the drum axis. The end charts 5 are in reverse, or negative, so that positive images of the weight indications will be reflected by the mirrors 6—6 and projected through the viewing lenses 4.

Thus, at each side of the scale, weight indications from the transverse ends of the drum 1 are projected alongside and are viewed simultaneously with the computed-price indications on the drum periphery, through a common viewing window 4 and without turning the head. Also, it will be appreciated that the placing of the weight indicating charts on the transverse end faces of the drum 1 leaves the drum's peripheral face entirely free for computed-price characters which may thus be increased in number and size.

In an alternative arrangement, an optical deflecting mirror is adapted to direct an optical image of the characters on the peripheral face, axially to a position alongside the drum end, so that the indication given by the peripheral characters and the indication given by the characters on the drum end are viewable simultaneously.

The invention is not intended to be limited to the particular embodiment described above in detail for purposes of illustration. Rather it is contemplated that such changes may be made in the form, construction and arrangement of parts as will be suggested to one familiar with the art as will not depart from the spirit of the invention and will fall within the scope of the appended claims.

The invention is hereby claimed as follows:

1. In a weighing scale, apparatus for providing a visual indication of weight and of a plurality of prices corresponding to the weight, said apparatus comprising a horizontally rotatable drum having a cylindrical peripheral surface and at least one flat end surface, a first chart positioned about the peripheral surface of the drum and having indicating characters thereon, a stationary casing enclosing the drum and having an elongated horizontal opening in spaced relation with the drum to permit viewing of the chart thereon, said casing being of substantially greater length than the length of the drum to provide space for and to enclose mechanism for rotating the drum in accordance with weight placed on the scale, a second chart positioned about the peripheral portion of the end surface of the drum and having further indicating characters thereon, an optical deflecting means mounted in spaced relation with the elongated viewing opening of the casing and with the second chart on the end surface of the drum, said optical deflecting means being operative to deflect an image of the indicating characters from the second chart to be viewable through the opening and thereby to increase the number of indicating characters viewable along the length of the opening and to effectively extend the viewable chart area beyond the limits of the peripheral surface of the drum.

2. In a weighing scale, apparatus for providing a visual indication of weight and of a plurality of prices corresponding to the weight, said apparatus comprising a horizontally rotatable drum having a cylindrical peripheral surface and at least one flat end surface, a first chart positioned about the peripheral surface having price indicating characters thereon, a stationary casing enclosing the drum and having an elongated horizontal viewing opening in spaced relation with drum to permit viewing of the chart thereon, said casing being of substantially greater length than the length of the drum to provide space for and to enclose mechanism for rotating the drum in accordance with weight placed upon the scale, a second chart positioned about the peripheral portion of the end surface of the drum and having weight indicating characters thereon, a mirror mounted in spaced relation with an end of the elongated viewing opening of the casing and with the second chart on the end surface of the drum, said mirror being operative to reflect an image of the weight indicating characters from the second chart to be viewable through the opening and thereby to increase the number of indicating characters viewable along the length of the opening such that the effective viewable chart area includes both the price indicating characters within the limits of the peripheral surface of the drum and the weight indicating characters reflected to a position beyond the physical limits of the peripheral surface.

References Cited in the file of this patent

UNITED STATES PATENTS

| | | |
|---|---|---|
| 1,487,514 | Goss | Mar. 18, 1924 |
| 1,897,446 | Stimpson | Feb. 14, 1933 |
| 2,187,362 | Plissner | Jan. 16, 1940 |

FOREIGN PATENTS

| | | |
|---|---|---|
| 836,009 | France | Oct. 10, 1938 |